United States Patent
Meurer et al.

(10) Patent No.: US 10,443,648 B2
(45) Date of Patent: Oct. 15, 2019

(54) HINGE ASSEMBLY FOR A SPACE STRUCTURE

(71) Applicant: Airbus DS GmbH, Taufkirchen (DE)

(72) Inventors: René Meurer, Bruckmuehl (DE); Claus Zimmermann, Munich (DE); Juergen Mueller, Anzing (DE); Andreas Donner, Suhl (DE); Andreas Uebner, Ottobrunn (DE)

(73) Assignee: AIRBUS DS GMBH, Taufkirchen (DE)

(*) Notice: Subject to any disclaimer, the term of this patent is extended or adjusted under 35 U.S.C. 154(b) by 422 days.

(21) Appl. No.: 15/384,909

(22) Filed: Dec. 20, 2016

(65) Prior Publication Data
US 2017/0175806 A1 Jun. 22, 2017

(30) Foreign Application Priority Data
Dec. 21, 2015 (EP) .................................. 15201609

(51) Int. Cl.
*B64G 1/22* (2006.01)
*F16C 11/12* (2006.01)
(Continued)

(52) U.S. Cl.
CPC ............. *F16C 11/12* (2013.01); *B64G 1/222* (2013.01); *B64G 1/428* (2013.01); *B64G 1/44* (2013.01);
(Continued)

(58) Field of Classification Search
CPC .......... F16C 11/12; H02S 10/40; H02S 30/20; B64G 1/222; B64G 1/428; B64G 1/44
See application file for complete search history.

(56) References Cited

U.S. PATENT DOCUMENTS 3,386,128 A * 6/1968 Vyvyan .................... E05D 1/00
16/225
3,756,858 A * 9/1973 Dillard .................. B64G 1/222
136/245
(Continued)

FOREIGN PATENT DOCUMENTS

| EP | 1043228 | 10/2000 |
|---|---|---|
| FR | 2756028 | * 5/1998 |
| WO | 9960860 | 12/1999 |

OTHER PUBLICATIONS

European Search Report, dated May 25, 2016, priority document.

*Primary Examiner* — Justin M Benedik
(74) *Attorney, Agent, or Firm* — Greer, Burns & Crain, Ltd.

(57) ABSTRACT

A hinge assembly comprises first and second tape spring elements, wherein each of the spring elements is configured to connect a first element of a space structure to a second element of the space structure. Each of the first and the second tape spring elements is movable from a folded state into an unfolded state by releasing stored strain energy, to deploy the first and the second element of the space structure. The first tape spring element is connected to a first direct current source and configured to conduct direct current of a first polarity supplied to the first tape spring element from the first direct current source. The second tape spring element is connected to a second direct current source and configured to conduct direct current of a second polarity, opposite to the first polarity, supplied to the second tape spring element from the second direct current source.

18 Claims, 4 Drawing Sheets

(51) Int. Cl.
    *H02S 10/40*     (2014.01)
    *H02S 30/20*     (2014.01)
    *B64G 1/42*     (2006.01)
    *B64G 1/44*     (2006.01)

(52) U.S. Cl.
    CPC .............. H02S 10/40 (2014.12); H02S 30/20 (2014.12); *F16C 2204/60* (2013.01); *F16C 2208/02* (2013.01); *F16C 2223/30* (2013.01); *F16C 2350/54* (2013.01)

(56) References Cited

U.S. PATENT DOCUMENTS

| | | | |
|---|---|---|---|
| 4,384,163 A * | 5/1983 | Rauschenbach | B64G 1/222 136/245 |
| 6,147,294 A * | 11/2000 | Dailey | B64G 1/222 136/245 |
| 6,175,989 B1 | 1/2001 | Carpenter et al. | |
| 6,320,114 B1 * | 11/2001 | Kuechler | H01L 31/043 136/245 |
| 9,048,530 B2 | 6/2015 | Kellberg | |
| 2002/0194702 A1 | 12/2002 | Hinkley et al. | |
| 2006/0049317 A1 | 3/2006 | Rutenauer et al. | |
| 2012/0024342 A1 * | 2/2012 | Kalman | H01R 35/04 136/245 |

* cited by examiner

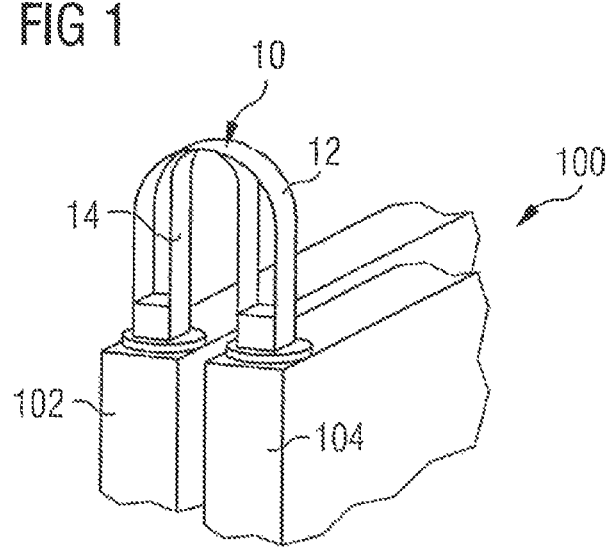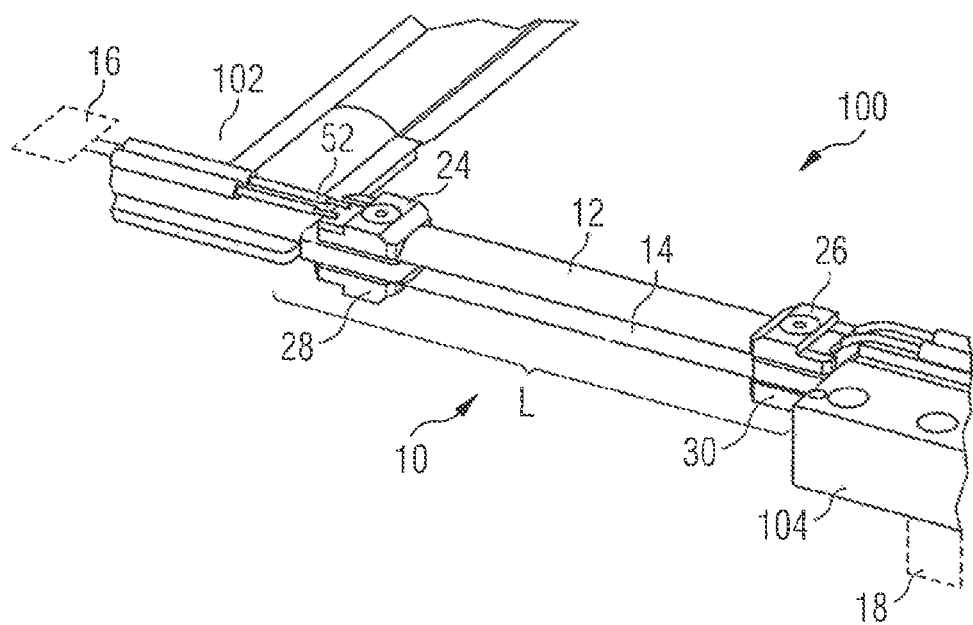

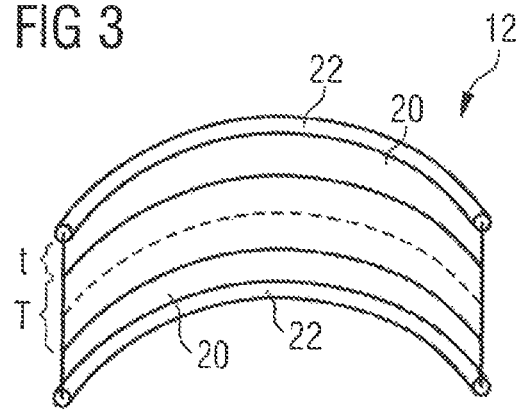
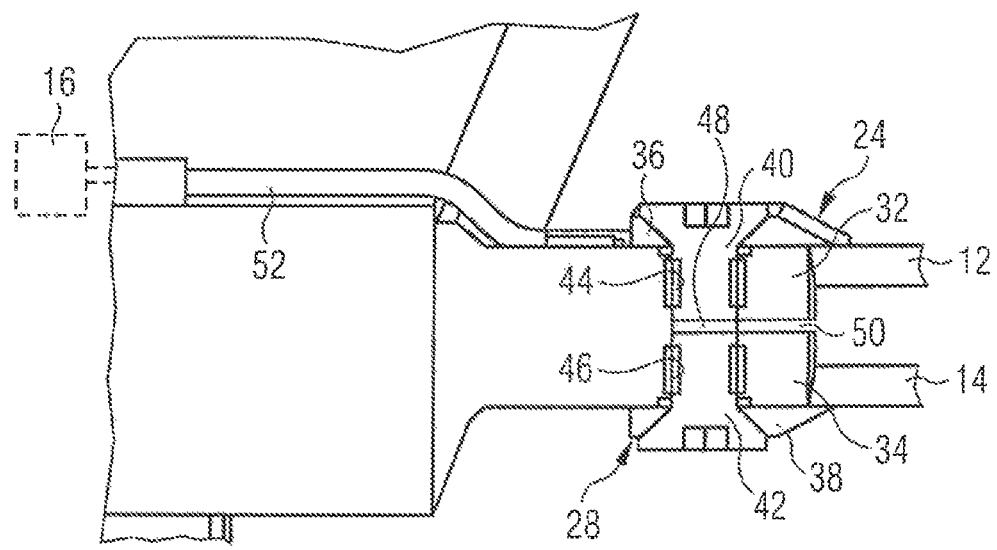

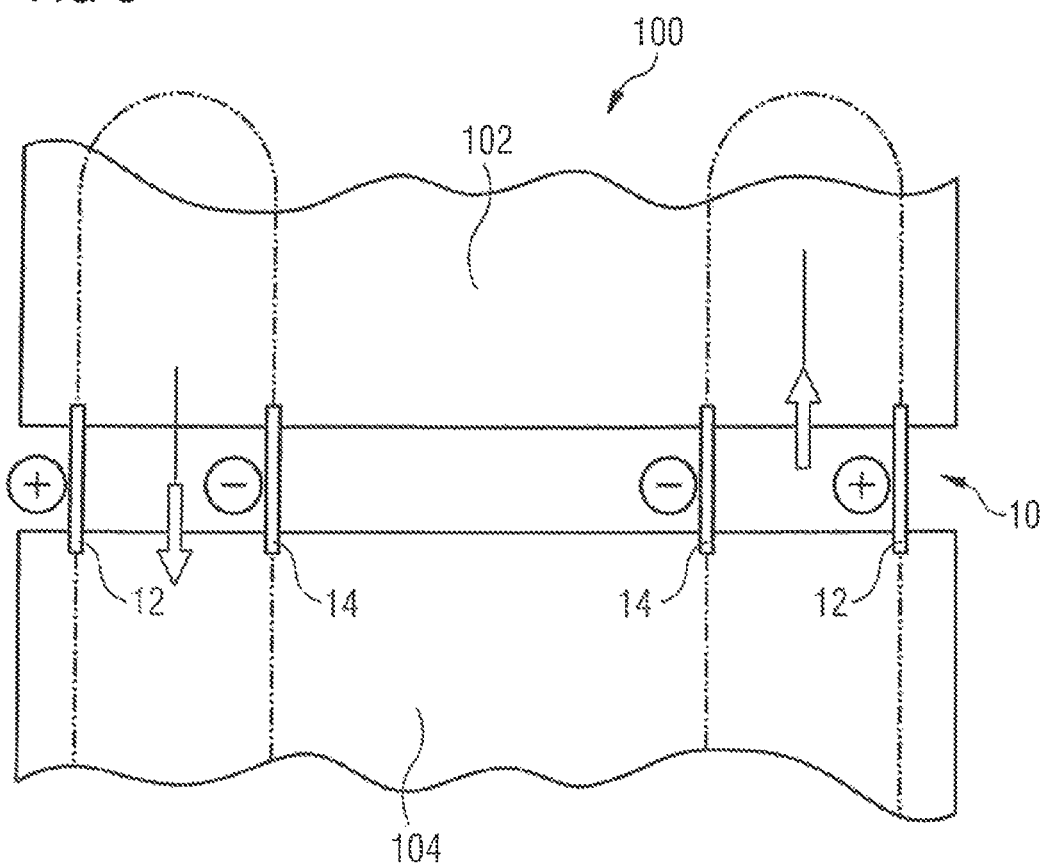

HINGE ASSEMBLY FOR A SPACE STRUCTURE

CROSS-REFERENCES TO RELATED APPLICATIONS

This application claims the benefit of the European patent application No. 15 201 609.3 filed on Dec. 21, 2015, the entire disclosures of which are incorporated herein by way of reference.

BACKGROUND OF THE INVENTION

The invention relates to a hinge assembly for use in a space structure. Furthermore, the invention relates to a space structure which is equipped with a hinge assembly of this kind.

At present, virtually all spacecraft are solar powered. The solar cells used are typically triple junction solar cells based on III-V semiconductor with an efficiency of 30% under the AM0 spectrum in space. But even with these high efficiency cells, the available surface area on currently used satellite structures usually is not sufficient to meet the power demand of most satellite payloads. Therefore, deployable structures are required. In a typical solar array, individual panels having a size compatible with a satellite sidewall are interconnected by hinges such that the entire assembly can be folded towards the satellite sidewall during launch. Once on station, the array can be unfolded into its final configuration. In most designs, the hinges between two panels have to provide the driving torque for the deployment, a locking mechanism to fix the panels at the desired deployment angle, typically 180°, as well as sufficient stiffness in the deployed configuration. The most widely used hinge type for this application consists of two separate elements which are joined by a fixed axis of rotation. A separate coiled spring provides the driving torque for the deployment. An electrical connection between adjacent panels of the solar array typically is established by separate wiring elements which may, for example, be designed in the form of a wire bundle located in the axis of rotation of the hinge. Alternatively, planar wire configurations may be used to electrically connect adjacent panels of the solar array.

US 2002/0194702 A1 describes a deployment hinge for interconnecting and deploying panels from a stowed configuration into a deployment configuration. The hinge is designed in the form of a flat plate and made of a superelastic shape memory alloy such as Nitinol having a large elastic strain limit for enabling the hinge to bend around a small radius during stowage and flexible return to a trained rigid hinge position. The hinge is conductive enabling use of the hinge as a conductor for routing power through multiple solar cell panels interconnected by the hinge forming a hinged solar cell array that is deployed when the hinge is released from the bent stowed configuration to the rigid deployed configuration. The hinge further functions as a latch to lock the panels in place.

U.S. Pat. No. 9,048,530 discloses a deployable flat panel array, wherein at least two panels are coupled together via a carpenter tape hinge which is suitable to release stored energy to deploy the flat panel array from a packed position.

WO 99/60860 A2 relates to a hinge for deploying an object which includes at least one flexure member which is capable of moving from a first, folded configuration to a second, straightened configuration. The hinge further comprises a controller for controlling the movement of the first flexure member as the first flexure member moves or reconfigures from the folded configuration to the straightened configuration. The first flexure member may be made of a shape memory alloy and may have an arcuate cross-sectional configuration. The controller may comprise a means for absorbing stored energy of the first flexure member as the first flexure member moves from the first, folded configuration to the second straightened configuration. The hinge is connected to an electric source which supplies electric current to the hinge to drive the deployment of the object.

SUMMARY OF THE INVENTION

The invention is directed at an object of providing a hinge assembly for use in a space structure which combines a mechanical deployment function with an electrical current transport function for carrying direct current of opposite polarities across the hinge assembly. Further, the invention is directed at an object of providing a space structure which is equipped with a hinge assembly of this kind.

A hinge assembly comprises a first tape spring element and a second tape spring element. Each of the first and the second tape spring element is adapted to connect a first element of a space structure to a second element of the space structure. Furthermore, each of the first and the second tape spring elements is movable from a folded state into an unfolded state by releasing stored strain energy so as to deploy the first and the second element of the space structure. At least one of the first and the second tape spring element may be designed in the form of a self-actuating and/or self-locking spring element. For example, at least one of the first and the second tape spring element may be designed in the form of a carpenter spring element which may be buckled and folded into a stowed configuration and which, upon deployment, and hence release of the stored strain energy, may be locked in a strain free energy condition.

In particular, in case at least one of the first and the second tape spring element is designed in the form of a self-actuating spring element, the hinge assembly may further comprise a latching mechanism which is suitable to latch the first and the second tape spring element in their folded state. The latching mechanism may be configured to directly interact with the first and the second tape spring element for latching the first and the second tape spring element in their folded state. It is, however, also conceivable to employ a latching mechanism which is configured to interact with the first and the second element of the space structure for holding the first and the second element of the space structure in an un-deployed state and to thereby latch the first and the second tape spring element in their folded state. Upon unlatching the latching mechanism, a tape spring element, which is designed in the form of a self-actuating spring element, automatically unfolds and hence deploys the first and the second element of the space structure.

At least one of the first and the second tape spring element may be substantially band-shaped and, in the folded state, may assume a configuration wherein a first and a second end of the tape spring element are arranged adjacent to each other in such a manner that the tape spring element is substantially U-shaped. In the unfolded state, at least one of the first and the second tape spring elements may assume a substantially straight configuration.

The first tape spring element is connected to a first direct current source and configured to conduct direct current provided by the first direct current source. Furthermore, the second tape spring element is connected to a second direct current source and configured to conduct direct current provided by the second direct current source. Hence, besides fulfilling the classical mechanical deployment function, the tape spring elements of the hinge assembly also function as conductors of electrical current. As a result, separate electrical connection elements such as wire bundles or the like can be dispensed with. This reduces both the complexity and the weight of a space structure equipped with the hinge assembly which leads to a simplification of the assembly and integration procedures. In addition, due to the absence of additional cables and wirings, the deployment process of a space structure equipped with the hinge assembly is less complex and less susceptible to failures and the tape spring elements are no longer required to overcome an additional resistive torque which is caused by additional cables and wirings upon deploying the elements of the space structure.

The first tape spring element is configured to conduct direct current of a first polarity which is supplied to the first tape spring element from the first direct current source. Furthermore, the second tape spring element is configured to conduct direct current of a second polarity opposite to the first polarity which is supplied to the second tape spring element from the second direct current source. The hinge assembly thus provides two separate current paths which can be used to conduct direct current of opposite polarities between the first and the second element of the space structure. At least one of the first and the second direct current source may be a direct current generating solar cell or solar panel. The hinge assembly thus is particularly suitable for use in solar powered space structures for interconnecting a first and a second solar panel and/or for connecting a solar panel to satellite-based structure.

In the hinge assembly, the tape spring elements function as electrical conductor elements. Thus, in order to keep a voltage drop across the hinge assembly within the desired limits, the electrical resistance of the tape spring elements is an important design parameter. For example, it may be defined that for a section current of 20 A, the voltage drop across the hinge assembly shall remain below 1 V. This requirement may be achieved by manufacturing the tape spring elements from a material having a high electrical conductivity such as, for example, a highly conductive metallic material. For example, the tape spring elements may be made of CuBe. It is, however, also conceivable to use alternative materials such as, for example stainless steel or a composite material, such as, for example, a fiber reinforced plastic material, in particular a carbon fiber reinforced plastic material for manufacturing the tape spring elements.

In case a material having a higher specific electrical resistance should be used for manufacturing the tape spring elements, for example in case this material provides the tape spring elements with the required mechanical properties, the voltage drop across the hinge assembly may be tailored by providing the hinge assembly with a required number of tape spring elements and thus current paths or by suitably dimensioning the tape spring elements and hence the current paths. Alternatively or additionally thereto, it is, however, also conceivable to coat at least one of the first and the second tape spring elements, on at least one main surface with a first coating that has such an electrical resistance and such a thickness that the coated tape spring element has a lower electrical resistance than the uncoated tape spring element. The electrical resistance, and hence the type of the first coating as well as the thickness of the first coating, may be tailored as required so as to achieve the desired electrical resistance of the coated tape spring element without affecting the mechanical properties of the tape spring element.

The first coating may be applied to only one main surface or to two opposing main surfaces of the tape spring element. It is, however, also conceivable to cover all surfaces of the tape spring element with the first coating.

The first coating may contain silver or may consist of silver, a material that has a low electrical resistance and that is also suitable for use in space applications. The thickness of the first coating may be approximately 8 to 12 µm and preferably approximately 10 µm. In particular, in case the tape spring element is made of a material having a higher electrical resistance, the application of a silver coating may significantly reduce the electrical resistance of the coated tape spring element as compared to the electrical resistance of the uncoated tape spring element.

At least one of the first and the second tape spring elements, on at least one main surface, may be provided with a second coating that has antistatic or insulating properties. Antistatic, instead of fully insulating properties, are beneficial for prevention of electrostatic discharge in certain space environments. The provision of an insulating second coating is particularly suitable when the tape spring elements of the hinge assembly contact each other, for example when the tape spring elements are in their folded state. In case the tape spring element is provided with a first coating, the second coating may be applied onto the first coating. The second coating may be applied to only one main surface or to two opposing main surfaces of the tape spring element. It is, however, also conceivable to cover all surfaces of the tape spring element with the second coating. Areas of the tape spring elements which are used for electrically connecting the tape spring elements to the first and the second direct current source, respectively, however, preferably are not covered with an insulating second coating.

The second coating may contain polyimide, for example Kapton, in particular carbon equipped polyimide, in order to achieve antistatic properties.

At least one of the first and the second coating may be attached to at least one of the first and the second tape spring element by means of an adhesive layer. The adhesive layer may contain an acrylic material, in particular in case the hinge assembly is intended for use in a low radiation environment. In case the hinge assembly is intended for use in a high radiation environment, the adhesive layer may contain a silicone material.

In a preferred embodiment of the hinge assembly, at least one of the first and the second tape spring element has a C-shaped cross-sectional shape. A tape spring element having C-shaped cross-sectional shape distinguishes by a high stiffness and thus excellent load bearing and load transferring capabilities.

The hinge assembly may further comprise a first fixation element which is attachable to the first element of the space structure and configured to attach the first tape spring element to the first element of the space structure. Further, the hinge assembly may comprise a second fixation element which is attachable to the second element of the space structure and configured to attach the first tape spring element to the second element of the space structure. Alternatively or additionally thereto, a third fixation element may be present, which is attachable to the first element of the space structure and configured to attach the second tape spring element to the first element of the space structure. Further, the hinge assembly may comprise a fourth fixation element which is attachable to the second element of the space structure and configured to attach the second tape spring element to the second element of the space structure. At least a portion of at least one of the first, the second, the third and the fourth fixation element may be made of an insulating material, in particular polyetheretherketone. A portion of the fixation element which is made of an insulating material provides for an electric insulation of the current path defined by the tape spring element attached to the first or the second element of the space structure by means of the fixation element.

At least one of the first, the second, the third and the fourth fixation element may comprise a supporting element. A supporting surface of the supporting element may have a shape that is adapted to the cross-sectional shape of the corresponding tape spring element. For example, the supporting surface of the supporting element may be provided with a curvature that is adapted to a curvature of a C-shaped cross-section of the tape spring element. At least one of the first, the second, the third and the fourth fixation element may further comprise a clamping element. A clamping surface of the clamping element may have a shape that is adapted to the cross-sectional shape of the corresponding tape spring element. For example, the clamping surface of the clamping element may be provided with a curvature that is adapted to a curvature of a C-shaped cross-section of the tape spring element. The supporting element and the clamping element may be adapted to interact which each other so as to clamp the corresponding tape spring element therebetween, i.e., between the supporting surface of the supporting element and the clamping surface of the clamping element.

The supporting element and the clamping element may be connected to each other by means of a fastener which is received in a bore provided in the supporting element. The fastener may be designed in the form of a screw and the bore may be provided with an internal thread which is suitable for interacting with an external thread of the screw. Additionally or alternatively thereto, the supporting element and the clamping element may be shaped and connected to each other in such a manner that a surface of an end portion of the corresponding tape spring element is exposed. The exposed end portion surface of the tape spring element then may be used for establishing the electrical connection between the tape spring element and the associated first or second direct current source.

An electrical connection between electrical wiring connected to the first direct current source and the first tape spring element may be established by directly bonding the electrical wiring to the first tape spring element, in particular, to the exposed surface of the end portion of the first tape spring element. Alternatively, the electrical connection may be established by mechanically pressing and thereby electrically contacting the electrical wiring to the first tape spring element by means of a first contact fastener. The first contact fastener which may, for example, be designed in the form of a screw may be arranged in the region of the exposed surface of the end portion of the first tape spring element and may penetrate the first tape spring element in the region of the exposed end portion surface so as to interact with the supporting element of the respective fixation element. As a further alternative, the electrical connection between electrical wiring connected to the first direct current source and the first tape spring element may be established by mechanically pressing and thereby electrically contacting the electrical wiring to an electrically conductive clamping element by means of a second contact fastener. The second contact fastener which may, for example, be designed in the form of a screw, may be arranged in a region of a side surface of the clamping element.

Similarly, an electrical connection between electrical wiring connected to the second direct current source and the second tape spring element may be established by directly bonding the electrical wiring to the second tape spring element, in particular to the exposed surface of the end portion of the second tape spring element. Alternatively, the electrical connection may be established by mechanically pressing and thereby electrically contacting the electrical wiring to the second tape spring element by means of a first contact fastener. The first contact fastener which may, for example, be designed in the form of a screw, may be arranged in the region of the exposed surface of the end portion of the second tape spring element and may penetrate the second tape spring element in the region of the exposed end portion surface so as to interact with the supporting element of the respective fixation element. As a further alternative, the electrical connection between electrical wiring connected to the second direct current source and the first tape spring element may be established by mechanically pressing and thereby electrically contacting the electrical wiring to an electrically conductive clamping element by means of a second contact fastener. The second contact fastener which may, for example, be designed in the form of a screw, may be arranged in a region of a side surface of the clamping element.

A space structure comprises a first element and the second element. The first and the second element are connected to each other by means of an above-described hinge assembly.

In a preferred embodiment of the space structure, the first and the second tape spring element with respect to opposing edges of the first and the second element of the space structure, in their unfolded configuration are arranged one above another. The first and the third fixation element for attaching the first and the second tape spring element to the first element of the space structure then may be formed integral with each other. Similarly, the second and the fourth fixation element for attaching the first and the second tape spring element to the second element of the space structure may be formed integral with each other. Such "double" fixation elements, however, should be designed in such a manner that fasteners which are used for connecting the supporting elements and the clamping elements of the fixation elements to each other do not contact each other. Instead, an insulating material layer or an air gap should be provided between tips of the fasteners for connecting the supporting elements and the clamping elements of the fixation elements to each other. In case an air gap is provided between the fasteners, the air gap should be connected to a venting hole which allows the air present in the air gap to escape once the space structure is exposed to a vacuum environment in order to avoid discharge effects.

The first and the second tape spring element may be arranged in such a manner that the cross-sectional shapes of the first and the second tape spring element are provided with opposite curvatures. Such a design and arrangement of the tape spring elements improves the mechanical stability of the hinge assembly.

A magnetic moment which is induced by conducting direct current of opposite polarities through the tape spring elements of the space structure can be calculated by multiplying the current with the area enclosed by a particular current path given according to a wire configuration. The magnetic moment is the relevant quantity that determines a torque created in an external magnetic field. Elements of a space structure with a non-vanishing magnetic moment are therefore exposed to an external, disturbing torque that has to be compensated by an attitude control system of the space structure. It is therefore beneficial to reduce any magnetic moment of the space structure as far as possible, and ideally to zero.

In case the space structure comprises only two tape spring elements, i.e., one first and one second tape spring element, an arrangement of the tape spring elements in such a manner that the first and the second tape spring element with respect to opposing edges of the first and the second element of the space structure, in their unfolded configuration are arranged one above another has the effect that the magnetic moment which is induced by conducting direct current of opposite polarities through the first and the second tape spring element becomes zero. The presence of an uneven number of tape spring elements in the space structure necessarily leads to a residual magnetic moment and hence should be avoided.

In case the space structure comprises a plurality of first tape spring elements and an equal plurality of second tape spring elements, the first and the second tape spring elements preferably are arranged in pairs of a first and the second tape spring element and in pairs of a second and a first tape spring element side by side along opposing edges of the first and the second element of the space structure. The pairs of tape spring elements then induce magnetic moments which are directed in opposite directions. A sum of the distances between the first and the second tape spring element along the opposing edges of the first and the second element of the space structure in the pairs of a first and a second tape spring element preferably is equal to a sum of the distances between the second and the first tape spring element along the opposing edges of the first and the second element of the space structure in the pairs of a second and a first tape spring element. The magnetic moments induced by the pairs of tape spring elements, due to being directed in opposite directions and due to being of an equal amount, then are cancelled out, resulting in a total magnetic moment of zero.

BRIEF DESCRIPTION OF THE DRAWINGS

Preferred embodiments of a hinge assembly for use in a space structure and a space structure comprising a hinge assembly now will be described in greater detail with reference to the accompanying schematic drawings, wherein FIG. 1 shows a space structure comprising a hinge assembly for connecting a first and the second element of the space structure, the hinge assembly comprising a first and the second tape spring element which are arranged in a folded state, FIG. 2 shows the hinge assembly according to FIG. 1 with the first and the second tape spring element being arranged in an unfolded state, FIG. 3 shows a cross-sectional view of a tape spring element employed in the hinge assembly according to FIG. 1, FIG. 4 shows a cross-sectional view of a first and a third fixation element used for connecting the first and the second tape spring element of the hinge assembly to the first element of the space structure, FIG. 6 shows a space structure comprising a plurality of tape spring elements.

DETAILED DESCRIPTION OF THE PREFERRED EMBODIMENTS

Figure 5A:
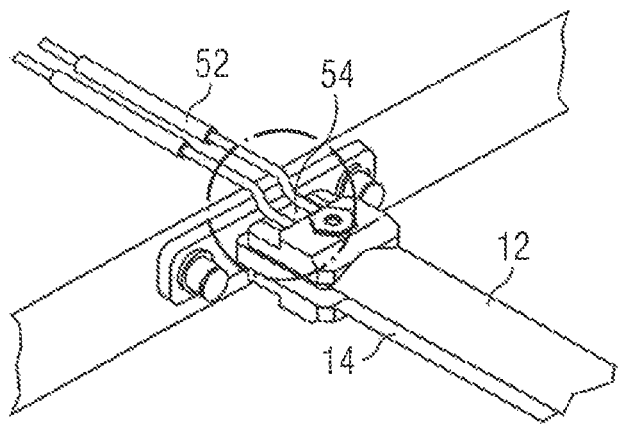
FIGS. 5a to 5c show different alternatives for establishing an electrical connection between electrical wiring and a tape spring element of the hinge assembly according to FIG. 1.

FIGS. 1 and 2 show a space structure 100 which comprises a first element 102 and a second element 104. The first and the second element 102, 104 of the space structure 100 may, for example, be designed in the form of solar panels. It is, however, also conceivable that one of the first and the second element 102, 104 is designed in the form of a solar panel and the other one of the first and the second element 102, 104 is designed in the form of a satellite-based structure. During launch of the space structure 100, the first and the second element 102, 104 assume a folded, un-deployed configuration wherein the first and the second element 102, 104 are arranged substantially parallel to each other, see FIG. 1. Once on station, a surface area of the space structure 100, however, should be enlarged by deploying the first and the second element 102, 104 so as to arrange the first and the second element 102, 104 substantially coplanar to each other as depicted in FIG. 2. The first and the second element 102, 104 are connected to each other by means of a hinge assembly 10.

The hinge assembly 10 comprises a first tape spring element 12 and a second tape spring element 14. Each of the first and the second tape spring element 12, 14 establishes a connection between the first and the second element 102, 104 of the space structure 100. Furthermore, each of the first and the second tape spring element 12, 14 is movable from a folded state, see FIG. 1, into an unfolded state, see FIG. 2, by releasing stored strain energy. Both of the first and the second tape spring element 12, 14 are substantially band-shaped and, furthermore, have a C-shaped cross-sectional shape, see FIG. 3. In the hinge assembly 10, the tape spring elements 12, 14 are arranged in such a manner that the cross-sectional shapes of the tape spring elements 12, 14 are provided with opposite curvatures, i.e., the tape spring elements 12, 14 are arranged in such a manner that concave main surfaces of the tape spring elements 12, 14 face each other.

In their folded state, each of the tape spring elements 12, 14 assumes a configuration wherein a first and a second end of the tape spring element 12, 14 are arranged adjacent to each other in such a manner that the tape spring element 12, 14 is substantially U-shaped. In the unfolded state, the first and the second tape spring elements 12, 14 assume a substantially straight configuration and, with respect to opposing edges of the first and the second element 102, 104 of the space structure 100, are arranged one above another. Both tape spring elements 12, 14 are designed in the form of self-actuating and self-locking carpenter spring elements which are held in their folded configuration by means of a latching mechanism (not shown). The latching mechanism may, for example, interact with the first and the second element 102, 104 of the space structure 100 so as to hold the first and the second element 102, 104 of the space structure 100 parallel to each other as shown in FIG. 1. Upon unlatching the latching mechanism, the strain energy stored in the tape spring elements 12, 14 is released and the tape spring elements 12, 14 move from their folded state according to FIG. 1 into their unfolded state according to FIG. 2. Thereby, the elements 102, 104 of the space structure 100 are deployed.

The first tape spring element 12 is connected to a first direct current source 16 and configured to conduct direct current provided by the first direct current source 16. The second tape spring element 14 is connected to a second direct current source 18 and configured to conduct direct current provided by the second direct current source 18. Each of the first and the second direct current source 16, 18 may, for example, be designed in the form of a direct current generating solar cell or solar panel and in the drawings is illustrated only schematically. The tape spring elements 12, 14 of the hinge assembly 12 thus, besides fulfilling the classical mechanical deployment function, also serve as conductors of electrical current. As a result, separate electrical connection elements such as wire bundles or the like can be dispensed with.

In particular, the first tape spring element 12 conducts direct current of a first polarity (+) which is supplied to the first tape spring element 12 from the first direct current source 16. To the contrary, the second tape spring element 14 conducts direct current of a second polarity (−) opposite to the first polarity (+) which is supplied to the second tape spring element 14 from the second direct current source 18. The hinge assembly 10 thus provides two separate current paths which can be used to conduct direct current of opposite polarities (+/−) between the first and the second elements 102, 104 of the space structure 100.

A voltage drop across the hinge assembly 10 should be maintained within desired limits, for example below 1 V for a section current of 20 A. In order to achieve this requirement, the tape spring elements 12, 14 may be made of a material having a high electrical conductivity such as, for example, a highly conductive metallic material. For example, the tape spring elements 12, 14 may be made of CuBe. It is, however, also conceivable to use alternative materials such as, for example stainless steel or a composite material, such as, for example, a fiber reinforced plastic material, in particular a carbon fiber reinforced plastic material (CFRP) for manufacturing the tape spring elements 12, 14.

Table 1 depicted below indicates the specific resistance $r_b$ of different materials which may be used for manufacturing the tape spring elements 12, 14 and the resulting resistance $R_b$ of the hinge assembly 10. The resistance $R_b$ of the uncoated hinge assembly 10 is calculated using the equation $$R_b = r_b * L/(b*T),$$

where L is a length of the tape spring elements 12, 14, assumed as 20 cm, T is a thickness of the tape spring elements 12, 14, assumed as 0.15 mm, and b a width of the tape spring elements 12, 14, assumed as 1 cm.

The voltage drop across the hinge assembly 10 may be calculated using the equation $$R_b * I,$$

where I is a current conducted through the tape spring elements 12, 14 and assumed to be 20 A.

TABLE 1

Specific resistance and resulting voltage drop, calculated for a current of 20 A, for uncoated and Ag coated tape spring elements of different base materials

| hinge base material | specific resistance $r_b$ | resistance uncoated tape spring element $R_b$ | voltage drop | combined resistance tape spring element and coating | voltage drop |
|---|---|---|---|---|---|
| CuBe | 1.00E−07 Ωm | 0.013 Ω | 0.27 V | 0.007 Ω | 0.15 V |
| stainless steel (Cr 18%/Ni 8%) | 6.90E−07 Ωm | 0.092 Ω | 1.84 V | 0.014 Ω | 0.27 V |
| CFRP | 5.00E−06 | 0.667 Ω | 13.33 V | 0.016 Ω | 0.31V |

TABLE 1-continued

Specific resistance and resulting voltage drop, calculated for a current of 20 A, for uncoated and Ag coated tape spring elements of different base materials

| | Ωm | |
|---|---|---|
| | specific resistance rs | resistance coating |
| 10 μm Ag layer (front & rearside) | 1.60E−08 Ωm | 0.016 Ω |

While the voltage drop across a hinge assembly 10 comprising tape spring elements 12, 14 made of CuBe is negligible, tape spring elements 12, 14 made of stainless steel lead to a voltage drop across the hinge assembly 10 of almost 2 V. Tape spring elements 12, 14 made of a carbon fiber reinforced plastic material even result in a voltage drop across the hinge assembly 10 of more than 10 V.

In particular, in case material having a higher specific electrical resistance, such as stainless steel or a carbon fiber reinforced plastic material, should be used for manufacturing the tape spring elements 12, 14, the voltage drop across the hinge assembly 10 may be tailored by applying a first coating 20 to at least one main surface of the tape spring elements 12, 14. The material of the first coating 20 may have a specific resistance is which is lower, typically by a factor of ten, than $r^b$. A thickness t of the first coating 20 typically is smaller than a thickness T of the tape spring element 12, 14. The first coating 20 may be applied by various methods such as electron beam evaporation or sputtering.

The first coating 20 may contain silver or may consist of silver. The thickness of the first coating 20 may be approximately 8 to 12 μm and preferably approximately 10 μm. As becomes apparent from table 1, the application of a silver coating 20 having a thickness t of 10 μm on both opposing main surfaces of a tape spring element 12, 14 significantly reduces the electrical resistance of the coated tape spring element 12, 14 as compared to the electrical resistance of the uncoated tape spring element 12, 14.

As further becomes apparent from FIG. 3, the tape spring elements 12, 14, on at least one main surface, are provided with a second coating 22 that has antistatic or insulating properties. In the embodiment of a tape spring element 12, 14 depicted in FIG. 3, the second coating 22 is applied onto the first coating 20 on both opposing main surfaces of the tape spring element 12, 14. The second coating 22 may contain or comprise polyimide, for example Kapton, in particular, carbon equipped polyimide.

The first and the second coating 20, 22 may be attached to at least one of the first and the second tape spring element 12, 14 by means of an adhesive layer which may contain an acrylic material or a silicone material.

The hinge assembly 10 further comprises a first fixation element 24 which is attached to the first element 102 of the space structure 100 so as to attach the first tape spring element 12 to the first element 102 of the space structure 100. Further, the hinge assembly 10 comprises a second fixation element 26 which is attached to the second element 104 of the space structure 100 so as to attach the first tape spring element 12 to the second element 104 of the space structure 100. Further, a third fixation element 28 is present, which is attached to the first element 102 of the space structure 100 so as to attach the second tape spring element 14 to the first element 102 of the space structure 100.

Further, the hinge assembly 10 comprises a fourth fixation element 30 which is attached to the second element 104 of the space structure 100 so as to attach the second tape spring element 14 to the second element 104 of the space structure 100.

FIG. 4 shows a cross-sectional view of the first and the third fixation element 24, 28, wherein, however, in the embodiment of a hinge assembly 10 depicted in the drawings, and the second and the fourth fixation element 26, 30 are of identical design. As becomes apparent from FIG. 4, each fixation element 24, 28 comprises a supporting element 32, 34. A supporting surface of the supporting elements 32, 34 is provided with a shape that is adapted to the C-shaped cross-sectional shape of the corresponding tape spring element 12, 14. In particular, the supporting surface of the supporting element 32 which interacts with a concave surface of the first tape spring element 12 is provided with a corresponding convex curvature, whereas the supporting surface of the supporting element 34 which interacts with a convex surface of the second tape spring element 14 is provided with a corresponding concave curvature.

Furthermore, each of the fixation elements 24, 28 comprises a clamping element 36, 38 which interacts with the corresponding supporting element 32, 34 so as to clamp the corresponding tape spring element 12, 14 therebetween, i.e., between the supporting surface of the supporting element 32, 34 and a clamping surface of the clamping element 36, 38. A clamping surface of the clamping elements 36, 38 is provided with a shape that is adapted to the C-shaped cross-sectional shape of the corresponding tape spring element 12, 14. In particular, the clamping surface of the clamping element 36 which interacts with a convex surface of the first tape spring element 12 is provided with a corresponding concave curvature, whereas the clamping surface of the clamping element 38 which interacts with a concave surface of the second tape spring element 14 is provided with a corresponding convex curvature.

In each of the fixation elements 24, 28, the supporting element 32, 34 and the clamping element 36, 38 are connected to each other by means of a fastener 40, 42 which is received in a bore 44, 46 provided in the supporting element 32, 34. The fastener 40, 42 is designed in the form of a screw and the bore 44, 46 is provided with an internal thread which is suitable for interacting with an external thread of the screw.

In the arrangement according to FIGS. 1, 2 and 4, wherein the fixation elements 24, 28 interact with first and second tape spring elements 12, 14 which, with respect to opposing edges of the first and the second element 102, 104 of the space structure 100, in their unfolded configuration are arranged one above another, the first and the third fixation element 24, 28 may be formed integral with each other as depicted in FIG. 4. Similarly, the second and the fourth fixation element 26, 30 for attaching the first and the second tape spring element 12, 14 to the second element 104 of the space structure 100 may be formed integral with each other. In order to ensure that tips of the fasteners 40, 42 do not contact each other, an insulating material 48 is provided between the tips of the fasteners 40, 42. Alternatively, an air gap could be provided between the tips of the fasteners 40, 42. In case an air gap is provided between the fasteners, the air gap is connected to a venting hole 50 which allows the air present in the air gap to escape once the space structure 100 is exposed to a vacuum environment.

Figure 5B:
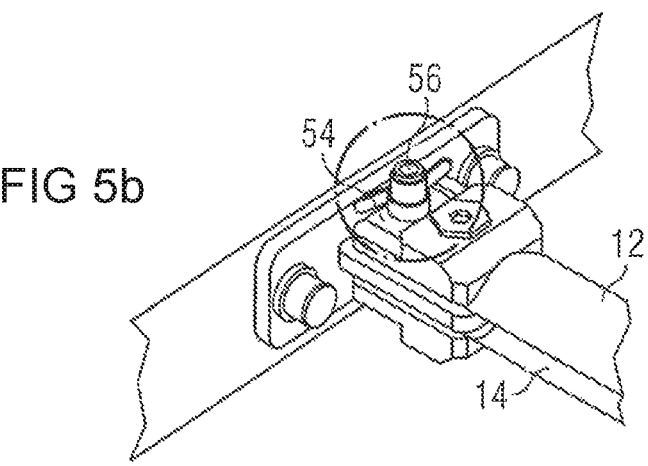
Figure 5C:
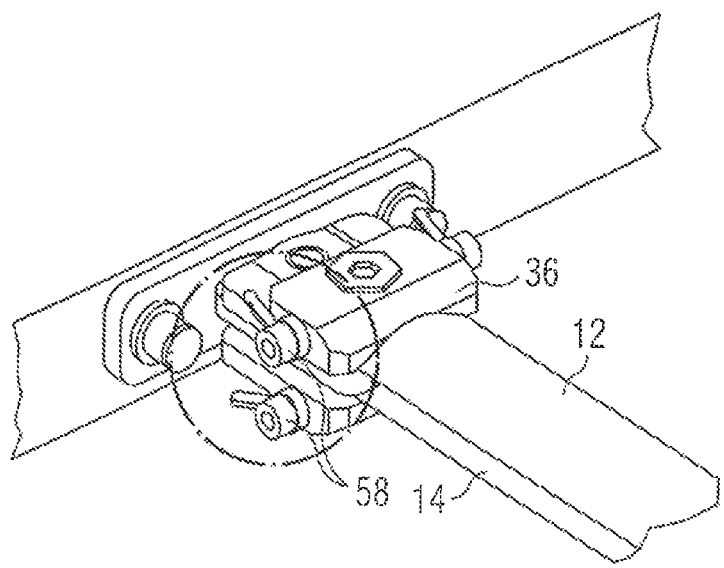

FIGS. 5a to 5c show various alternatives for establishing an electrical connection between electrical wiring 52 and a tape spring element 12 of the hinge assembly 10.

The supporting element 32, 34 and the clamping element 36, 38 are shaped and connected to each other in such a manner that a surface of an end portion 54 of the corresponding tape spring element 12 is exposed. In the arrangement according to FIG. 5a, the electrical connection between the electrical wiring 52 connected to the first direct current source 16 and the first tape spring element 12 is established by directly bonding the electrical wiring 52 to the exposed surface of the end portion 54 of the first tape spring element 12. In the arrangement according to FIG. 5b, the electrical connection is established by mechanically pressing and thereby electrically contacting the electrical wiring 52 to the first tape spring element 12 by means of a first contact fastener 56. The first contact fastener 56 which may, for example, be designed in the form of a screw, is arranged in the region of the exposed surface of the end portion 54 of the first tape spring element 12 and penetrates the first tape spring element 12 in the region of the exposed end portion surface so as to interact with the supporting element 32 of the fixation element 24.

In the arrangement according to FIGS. 5a and 5b, the entire fixation element 24, i.e., the supporting element 32 and the clamping element 36 of the fixation element 24, may be made of an insulating material, in particular polyetheretherketone. To the contrary, in the arrangement according to FIG. 5c, only the supporting element 32 is made of an insulating material. The clamping element 38 is made of an electrically conductive material. This allows the electrical connection between the electrical wiring 52 connected to the first direct current source 16 and the first tape spring element 12 to be established by mechanically pressing and thereby electrically contacting the electrical wiring 52 to the electrically conductive clamping element 38 by means of a second contact fastener 58. The second contact fastener 54 which may, for example, be designed in the form of a screw, may be arranged in a region of a side surface of the clamping element 38.

A magnetic moment which is induced by conducting direct current of opposite polarities (+/−) through the tape spring elements 12, 14 of the space structure 100 can be calculated by multiplying the current with the area enclosed by a particular current path given according to a wire configuration. In case the space structure 10 comprises only two tape spring elements 12, 14, i.e., one first and one second tape spring element 12, 14, an arrangement of the tape spring elements 12, 14 in such a manner that the first and the second tape spring element 12, 14 with respect to opposing edges of the first and the second element 102, 104 of the space structure 100, in their unfolded configuration are arranged one above another as shown in FIGS. 1, 2, 4 and 5 has the beneficial effect that the magnetic moment which is induced by conducting direct current of opposite polarities (+/−) through the first and the second tape spring element 12, 14 becomes zero.

In case the space structure comprises a plurality of first tape spring elements 12 and an equal plurality of second tape spring elements 14, the first and the second tape spring elements 12, 14 should be arranged in pairs of a first and the second tape spring element 12, 14 and in pairs of a second and a first tape spring element 14, 12 side by side along opposing edges of the first and the second element 102, 104 of the space structure space structure as shown for a configuration comprising a hinge assembly 10 with four tape spring elements 12, 14 in FIG. 6. The pairs of tape spring elements 12, 14 and 14, 12 then induce magnetic moments which are directed in opposite directions. A sum of the distances between the first and the second tape spring elements 12, 14 along the opposing edges of the first and the second element 102, 104 of the space structure 100 in the pairs of a first and a second tape spring element 12, 14 is equal to a sum of the distances between the second and the first tape spring element 40, 12 along the opposing edges of the first and the second element 102, 104 of the space structure 100 in the pairs of a second and a first tape spring element 40, 12. The magnetic moments induced by the pairs of tape spring elements 12, 14 and 14, 12, due to being directed in opposite directions and due to being of an equal amount, then are cancelled out, resulting in a total magnetic moment of zero.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A space structure comprising:
a first element, and
a second element,
wherein the first and second element are connected to each other by means of a hinge assembly comprising:
a first tape spring element,
a second tape spring element, wherein
each of the first and the second tape spring elements connects the first element of the space structure to the second element of the space structure,
each of the first and the second tape spring elements is movable from a folded state into an unfolded state by releasing stored strain energy so as to deploy the first and the second elements of the space structure,
the first tape spring element is connected to a first direct current source and configured to conduct direct current of a first polarity which is supplied to the first tape spring element from the first direct current source, and
the second tape spring element is connected to a second direct current source and configured to conduct direct current of a second polarity opposite to the first polarity which is supplied to the second tape spring element from the second direct current source,
wherein the space structure comprises a plurality of first tape spring elements and an equal plurality of second tape spring elements, the first and the second tape spring elements being arranged in pairs of a first and a second tape spring element and in pairs of a second and a first tape spring element side by side along opposing edges of the first and the second element of the space structure, wherein a sum of the distances between the first and the second tape spring element along the opposing edges of the first and the second element of the space structure in the pairs of a first and a second tape spring element is equal to a sum of the distances between the second and the first tape spring elements along the opposing edges of the first and the second elements of the space structure in the pairs of a second and a first tape spring element.

2. The space structure according to claim 1, wherein at least one of the first and the second tape spring elements is made of one of CuBe, stainless steel or a fiber reinforced plastic material.

3. The space structure according to claim 2, wherein at least one of the first and the second tape spring element is made of a carbon fiber reinforced plastic material.

4. The space structure according to claim 1, wherein at least one of the first and the second tape spring elements, on at least one main surface, is provided with a first coating that has such an electrical resistance, and such a thickness, that the coated tape spring element has a lower electrical resistance than the uncoated tape spring element.

5. The space structure according to claim 3, wherein the first coating contains silver.

6. The space structure according to claim 3, wherein the first coating has a thickness of approximately 8 to 12 μm.

7. The space structure according to claim 1, wherein at least one of the first and the second tape spring elements, on at least one main surface, is provided with a second coating that has one of antistatic or insulating properties.

8. The space structure according to claim 7, wherein the second coating contains polyimide.

9. The space structure according to claim 8, wherein the second coating contains carbon equipped polyimide.

10. The space structure according to claim 1, wherein at least one of the first and the second coatings is attached to at least one of the first and the second tape spring elements by means of an adhesive layer containing one of an acrylic material or a silicone material.

11. The space structure according to claim 8, wherein at least one of the first and the second tape spring elements has a C-shaped cross-sectional shape.

12. The space structure according to claim 1, further comprising at least one of:
a first fixation element which is attachable to the first element of the space structure and configured to attach the first tape spring element to the first element of the space structure and a second fixation element which is attachable to the second element of the space structure and configured to attach the first tape spring element to the second element of the space structure, and
a third fixation element which is attachable to the first element of the space structure and configured to attach the second tape spring element to the first element of the space structure and a fourth fixation element which is attachable to the second element of the space structure and configured to attach the second tape spring element to the second element of the space structure,
wherein at least a portion of at least one of the first, the second, the third and the fourth fixation element is made of an insulating material.

13. The space structure according to claim 1, wherein the insulating material comprises polyetheretherketone.

14. The space structure according to claim 13, wherein at least one of the first, the second, the third or the fourth fixation elements comprises:
a supporting element, a supporting surface of which has a shape that is adapted to the cross-sectional shape of the corresponding tape spring element, and
a clamping element, a clamping surface of which has a shape that is adapted to the cross-sectional shape of the corresponding tape spring element, the supporting element and the clamping element being adapted to clamp the corresponding tape spring element therebetween.

15. The space structure according to claim 14, wherein at least one of:
   the supporting element and the clamping element are connected to each other via a fastener received in a threaded bore provided in the supporting element, or
   the supporting element and the clamping element are shaped and connected to each other in such a manner that a surface of an end portion of the corresponding tape spring element is exposed.

16. The space structure according to claim 1, wherein an electrical connection between electrical wiring connected to the first direct current source and the first tape spring element is established by one of:
   directly bonding the electrical wiring to the first tape spring element, in particular the exposed surface of the end portion of the first tape spring element,
   mechanically pressing and thereby electrically contacting the electrical wiring to the first tape spring element via a first contact fastener in the region of the exposed surface of the end portion of the first tape spring element, or
   mechanically pressing and thereby electrically contacting the electrical wiring to an electrically conductive clamping element by means of a second contact fastener.

17. The space structure according to claim 1, wherein an electrical connection between electrical wiring connected to the second direct current source and the second tape spring element is established by one of:
   directly bonding the electrical wiring to the second tape spring element, specifically, the exposed surface of the end portion of the second tape spring element,
   mechanically pressing and thereby electrically contacting the electrical wiring to the second tape spring element by means of a first contact fastener, specifically, in the region of the exposed surface of the end portion of the second tape spring element, or
   mechanically pressing and thereby electrically contacting the electrical wiring to an electrically conductive clamping element via a second contact fastener.

18. The space structure according to claim 1, wherein the first and the second tape spring elements, with respect to opposing edges of the first and the second element of the space structure, in their unfolded configuration are arranged one above another, and specifically, in such a manner that the cross-sectional shapes of the first and the second tape spring element are provided with opposite curvatures.

* * * * *